Sept. 1, 1925.  
E. S. RAUWORTH  
1,552,232  
TAIL SHAPER FOR PIANO HAMMERS  
Filed June 4, 1923
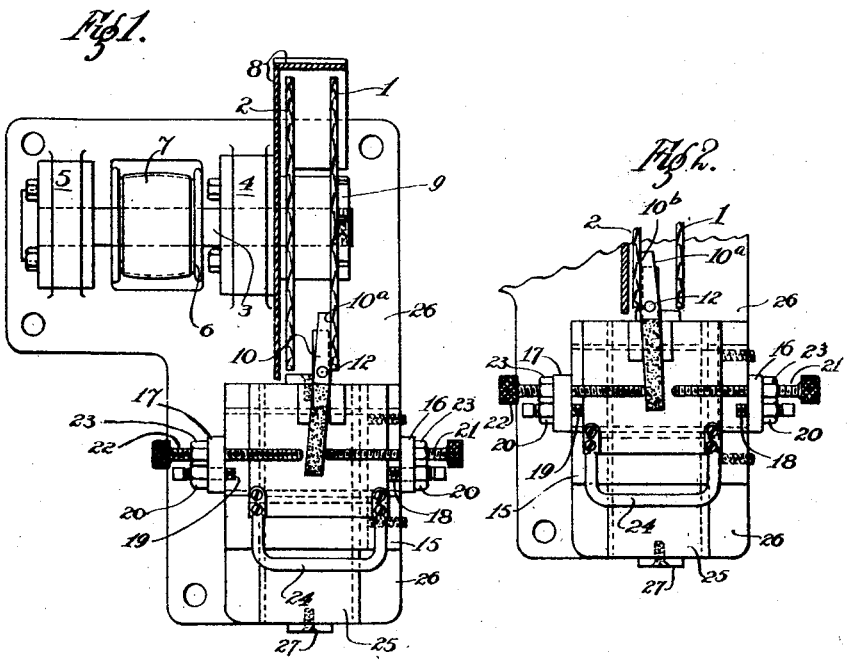
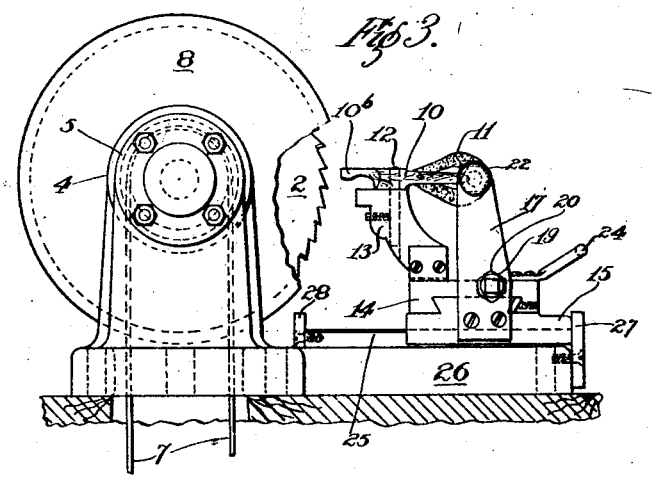
INVENTOR.  
Edwin S. Rauworth.  
By Burton & Burton  
his ATTORNEYS.
Witness.  
N. F. McKnight.

Patented Sept. 1, 1925.

1,552,232

UNITED STATES PATENT OFFICE.

EDWIN S. RAUWORTH, OF DE KALB, ILLINOIS, ASSIGNOR TO APOLLO PIANO COMPANY, OF DE KALB, ILLINOIS, A CORPORATION OF ILLINOIS.

TAIL SHAPER FOR PIANO HAMMERS.

Application filed June 4, 1923. Serial No. 643,196.

*To all whom it may concern:*

Be it known that I, EDWIN S. RAUWORTH, a citizen of the United States, residing at De Kalb, in the county of De Kalb and State of Illinois, have invented certain new and useful Improvements in Tail Shapers for Piano Hammers, of which the following is a specification, reference being had to the accompanying drawings, forming a part thereof.

The purpose of this invention is to provide a simple machine for rapidly shaping the tail portion of a piano hammer. It consists in certain features of construction and combinations of parts herein shown and described as indicated by the claims.

In the drawings:—

Figure 1 is a top plan view of a machine embodying this invention with the saw guard partially cut away and shown in section and with the work carrier in operative relation to the saw.

Figure 2 is a partial plan view similar to Figure 1 but showing the work carrier in a different position of operation.

Figure 3 is an end elevation with the work carrier withdrawn from the saw.

This machine comprises essentially a pair of circular saws mounted in spaced relation on the same shaft and a movable work carrier arranged adjacent the saws. The machine is designed primarily for shaping the tail portions of piano action hammers by beveling them at both sides. The saws, 1 and 2, are mounted side by side on the shaft, 3, which is journaled in bearings, 4 and 5, and is provided with a drive pulley, 6, driven by a belt shown at 7. For the safety of the operator and to confine the dust and chips a guard in the nature of a hood, 8, may be provided over the peripheral portion and preferably at one side of the saws, 1 and 2. Omission of the guard at the other side of the saws leaves the securing nut, 9, at the end of the shaft 3, readily accessible for removal of the saws when necessary.

The piano hammer is shown as consisting of a wooden portion, 10, to which the usual felt padding is applied at 11, the opposite end of the part constituting the tail portion which is to be beveled. Intermediate its ends the wooden part, 10, is drilled to receive a rod or shank and this hole is utilized for positioning the hammer on an upstanding post, 12, secured in a bracket, 13, on the movable work carrier, 14. Said carrier is slidable in a direction parallel to the axis of the shaft, 3, on a base, 15, which itself is mounted for sliding in a direction perpendicular to said shaft axis.

Upstanding from the base, 15, are end brackets, 16 and 17, in which stop screws, 18 and 19, are adjustably secured for limiting the sliding movement of the carrier, 14, on the base, 15, the lock nuts, 20, being provided for securing said stop screws in adjusted position. The brackets, 16 and 17, also support work stops in the form of screws, 21 and 22, extending for engaging the felted end of the hammer, 10. These screws are provided with lock nuts, 23, and their position of adjustment determines the angle at which the member, 10, will stand with respect to the plane of either saw when the carrier, 14, is moved to one limit or the other of its range of travel on the base, 15.

For manipulating the carrier, the handle, 24, is provided and by means of this it may be adjusted laterally or the base, 15, may be moved toward or from the saws upon the guide way, 25, formed on the bed, 26, of the machine. A stop, 27, limits the movement of the base, 15, away from the saws and a similar stop, 28, limits its travel toward them.

For forming the bevel at $10^a$, on the part, 10, the carrier, 14, is moved against the stop screw, 18, as shown in Figure 1 so that the hammer engaging the stop, 21, is swung to a predetermined angle. This adjustment being made with the base, 15, withdrawn against the stop, 27, as shown in Figure 3, said base, 15, is now advanced to carry the hammer-tail against the saw, 1, for cutting the bevel, $10^a$. This advance is continued until arrested by the stop, 28, whereupon the carrier is retracted and the part, 14, is slidably moved against the stop, 19, thus bringing the hammer against the stop screw, 22, and swinging the part, 10, to an opposite angular position somewhat in the plane of the saw, 2. By again advancing the post, 15, to the stop 28, a second cut is made forming a bevel, $10^b$, and then upon withdrawal of the work carrier to the stop, 27, the part, 10, is quickly picked off the post, 12, and replaced by another part to be beveled.

I claim:—

1. In combination a pair of spaced cutters and a work carrier mounted for feeding movement toward and from the cutters, said carrier being also arranged for transverse movement for shifting the work from one cutter to the other and a pivotal holder for the work on the carrier permitting angular adjustment of the work about its pivot in addition to the feeding and shifting movements of the carrier.

2. In combination, a pair of spaced cutters and a work carrier provided with a pivotal holder for the work and mounted for feeding movement toward and from the cutters, said carrier being also arranged for transverse movement for shifting the work from one cutter to the other and stops positioned to engage the work at points distant from its pivotal holder during said transverse movement of the carrier.

3. In combination, a pair of cutters spaced apart to operate in parallel planes, a work carrier mounted for feeding movement toward and from the cutters and having a pivotal holder for the work, said carrier being also arranged for transverse movement for shifting the work from one cutter to the other and means for swinging the work on its pivotal mounting during such transverse shifting movement.

4. In combination, a pair of cutters spaced apart to operate in parallel planes, a work carrier mounted for movement transversely of said parallel planes together with means for automatically changing the angular relation of the work to said planes of operation when the carrier is moved transversely for shifting the work from one cutter to the other.

5. In combination, a pair of spaced cutters and a work carrier provided with a pivotal holder for the work and mounted for feeding movement toward and from the cutters, said carrier being also arranged for transverse movement for shifting the work from one cutter to the other and stops positioned to engage the work at points distant from its pivotal holder during said transverse movement of the carrier, said stops being adjustable to vary the resulting swing of the work.

6. In combination, a pair of circular saws mounted in spaced relation on the same shaft and a work carrier mounted for feeding movement toward and from the saws and also arranged for movement transversely of their parallel planes of operation for shifting the work from one saw to the other, adjustable stops arranged to limit such transverse movement for causing the saws to operate upon opposite sides of the work respectively and means for automatically shifting the angular relation of the work to the planes of the saws in said transverse movement of the carrier for securing non-parallel cuts on the work.

In testimony whereof, I have hereunto set my hand at De Kalb, Illinois, this 31st day of May, 1923.

EDWIN S. RAUWORTH.